United States Patent [19]

Jitsukawa et al.

[11] Patent Number: 4,670,880

[45] Date of Patent: Jun. 2, 1987

[54] METHOD OF ERROR DETECTION AND CORRECTION BY MAJORITY

[75] Inventors: Hirotoshi Jitsukawa, Tokyo; Tsutomu Maruyama, Fujisawa, both of Japan

[73] Assignee: International Business Machines Corp., Armonk, N.Y.

[21] Appl. No.: 756,425

[22] Filed: Jul. 18, 1985

[30] Foreign Application Priority Data

Sep. 11, 1984 [JP] Japan .................................. 59-188957

[51] Int. Cl.$^4$ .............................................. G06F 11/00
[52] U.S. Cl. ........................................ 371/36; 371/22; 371/67
[58] Field of Search ...................... 371/36, 49, 69, 50, 371/51, 70, 67, 22, 68; 364/200, 900

[56] References Cited

U.S. PATENT DOCUMENTS

| | | | |
|---|---|---|---|
| 3,772,649 | 11/1973 | Haselwood | 371/69 |
| 3,895,223 | 7/1975 | Newner | 371/36 |
| 4,001,692 | 1/1977 | Fenwick | 371/36 |
| 4,295,207 | 10/1981 | Resnick | 364/900 |
| 4,429,391 | 1/1984 | Lee | 371/49 |
| 4,583,224 | 4/1986 | Ishii | 371/36 |
| 4,604,745 | 8/1986 | Takasaki | 371/22 |

Primary Examiner—Michael R. Fleming
Attorney, Agent, or Firm—Robert W. Berray

[57] ABSTRACT

According to the present invention, each data (one byte data in the embodiments described below) is transferred three times in total. The original data is transferred as it is on one time, a data made by inverting the original data is transferred on another time, and a data made by permuting all bits of the original data on the remaining time. A receiver reconstructs the data by reconverting the inverted and bit permuted data to their original forms and determining a majority among these data and the separately transferred original data. The bit permuted data is generated, for example, by rotating right or left the original data by a predetermined number of bits utilizing a recirculating shift register. The receiver must perform a bit permuting operation which is reverse to that of the sender.

2 Claims, 3 Drawing Figures

METHOD OF ERROR DETECTION AND CORRECTION BY MAJORITY

FIELD OF THE INVENTION

The present invention relates to detection and correction of errors occurring in data transferred between two apparatuses, and more particularly to a method of error detection and correction by a majority voting.

CITATION OF THE PRIOR ART

An error detection code such as CRC is often used in a serial bus line. Upon error detection, a receiver requests a sender to retransmit the same data. In conventional systems, error recovery is thus attempted by the procedure of error detection and data retransmission. Some systems use a code having an error correction capability which is called ECC.

In many cases, an error occurring in the data transferred through the serial bus line is a single bit error and, therefore, a SEC/DED code capable of single error correction and double error detection may suffice. In a parallel bus, however, different solutions are required because the single and multi bit errors have like occurrence rates. Among the solutions, relatively simple and reliable is a method for reconstructing the original data by a majority voting. A sending apparatus (e.g. central processor) repeatedly sends out the same data to the parallel bus while a receiving apparatus (e.g. printer) connected to this parallel bus compares a plurality of received data with each other and reconstructs the original data by the majority voting. In that case, the error detecting capability can be increased by sending the data and its inverted form as described in Japanese Published Examined Patent Application No. 54-3336 and Japanese Published Unexamined Patent Application No. 55-107357.

PROBLEMS SOLVED BY THE INVENTION

If a permanent failure has occurred on a particular line in a parallel bus, the prior art majority scheme could not detect it. The reason is that the same data including a permanent error (e.g. stuck at "1") is repeatedly transferred and hence reconstructed as the original one when the majority voting is performed in the receiver. This is also true in a case where a failure other than the permanent one has occurred on a particular line for relatively a long time.

Therefore, an object of the invention is to provide a method of error detection and correction by a majority voting which allows a receiver to detect errors in transferred data even if a permanent and/or long term failure has occurred in a parallel bus.

SUMMARY OF THE INVENTION

According to the present invention, each data (one byte data in the embodiments described below) is transferred three times in total. The original data is transferred "as is" one time, data made by inverting the original data is transferred another time, and data made by permuting all bits of the original data the remaining time. A receiver reconstructs the data by reconverting the inverted and bit permuted data to their original forms and determining the majority among the reconstructed data and the separately transferred original data. The bit permuted data is generated, for example, by rotating right or left the original data by a predetermined number of bits utilizing a recirculating shift register. The receiver must perform a bit permuting operation which is reverse to that of the sender.

DETAILED DESCRIPTION OF THE DRAWINGS

Figure 1:
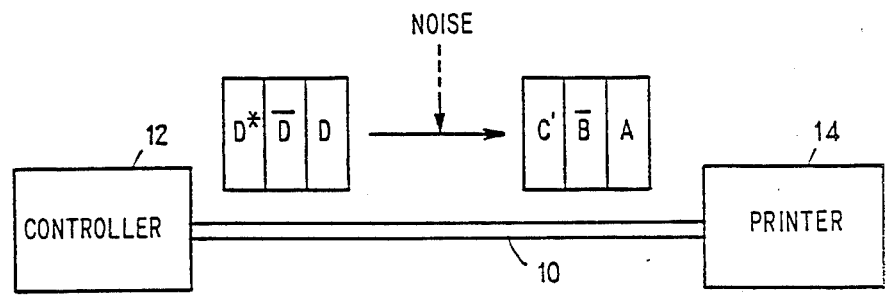
FIG. 1 is a block diagram illustrating a system to which the present invention can be applied.

FIG. 1 illustrates a system configuration to which the present invention can be applied. Although this includes a controller 12 (e.g. central processor) and a printer 14 interconnected by a parallel bus 10, the present invention is not limited to such a combination of the apparatuses. Upon sending a byte of data D to the printer 14, the controller 12 generates an inverted data $\overline{D}$ made by inverting D and a bit permuted data D* made by permuting all bits of D, and sequentially sends out these data to the parallel bus 10. Although in FIG. 1, D, $\overline{D}$ and D* are sent out in this order, one can adopt any order.

The printer 14 receives data A, $\overline{B}$ and C' corresponding to D, $\overline{D}$ and D*, respectively. There would be no problem if A=D, $\overline{B}=\overline{D}$ and C'=D*, but it is impossible to prevent the parallel bus 10 from being affected by a certain noise even with the best maintenance of the environment of the controller 12 and the printer 14 and, further, either breaking or short circuit may occur in a certain line of the parallel bus 10. An error caused by the noise temporarily changes a particular bit either from "0" to "1" or from "1" to "0". According to statistics, most errors change from "0" to "1". If the effect of the noise is limited within a transfer time of one byte, a correct data would be obtained by transferring the same dara D more than two times and using a majority logic in the receiver, as taught by the prior art. However, if the effect of the noise extends over a transfer time of more than one byte, the receiver would reconstruct an erroneous data as a correct one when, for example, the same error has occurred in at least two of three data D's. The present invention copes with such situations by transferring D, $\overline{D}$ and D* instead of transferring D three times.

The printer 14 temporarily stores the received byte of data A and reconverts $\overline{B}$ and C' to their original forms. Upon reconversion, B is generated by inverting $\overline{B}$ and C is generated by applying to C' an operation which is reverse to the bit permuting operation performed in the controller 12. If at least one of A=B, B=C and A=C is true, the printer 14 then accepts the compared data as D, otherwise informs the controller 12 of an error.

Figure 2:
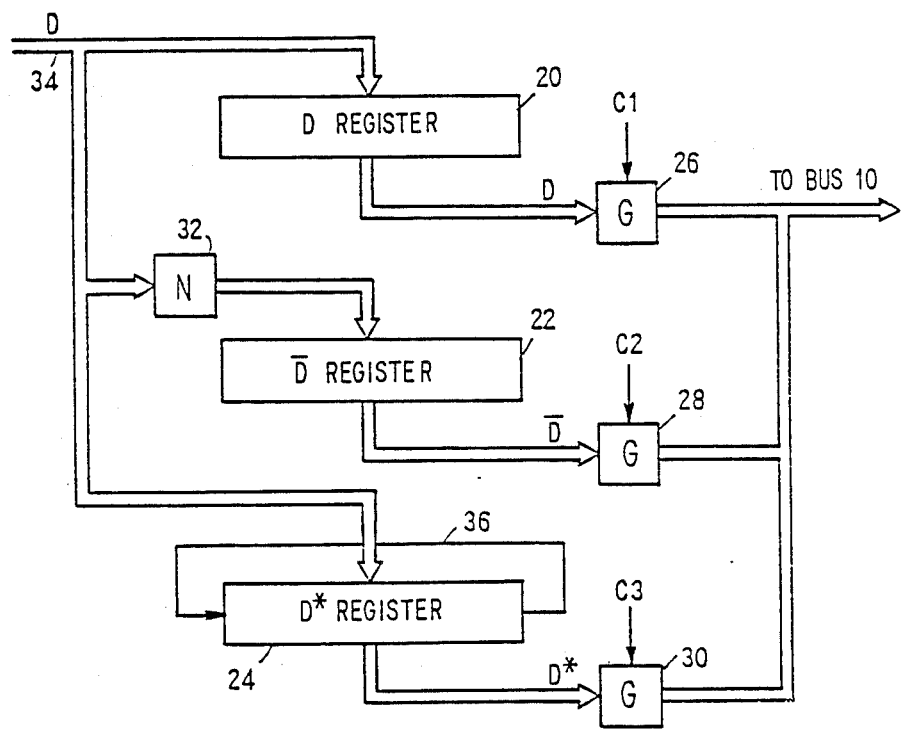
FIG. 2 is a block diagram showing a structural example of a data transferring section in the controller 12.

FIG. 2 shows a structural example of a data transferring section in the controller 12. This comprises three registers 20, 22 and 24 with respective output gates 26, 28 and 30, and an inverter 32. The controller 12 puts on an internal bus 34 a byte of data D to be transferred. The D register 20 and the D* register 24 receive this data D as it is while the $\overline{D}$ register 22 receives a data D inverted by the inverter 32. The D* register 24 is formed as a recirculating shift register having a recirculating path 36 which extends from the least significant bit position to the most significant bit position. When the D* register 24 receives the data D, it rotates the data D by a predetermined number n of bits through the recirculating path 36. N may be any number between one and the number of bits in the data D minus one (seven in this case) inclusive. For simplicity, it is assumed here that a right recirculating shift is done by one bit.

The output gate 26 outputs to the parallel bus 10 the original data D residing in the D register 20 in response to a first transfer clock C1, the output gate 28 outputs the inverted data $\overline{D}$ residing in the $\overline{D}$ register 22 in response to a second transfer clock C2, and the output gate 30 outputs the bit permuted data D* residing in the D* register 24 in response to a third transfer clock C3. The output sequence of the three data D, $\overline{D}$ and D* may be varied by changing the order to application of the transfer clocks C1, C2 and C3.

Although the D* register 24 is a recirculating shift register in the example of FIG. 1, any facility capable of changing a position of each bit in the data D may be used. For example, the higher and lower four bits of the data D may be replaced with each other. It is important that an i-th bit of the data D must become a bit in D* other than its i-th bit.

Figure 3:
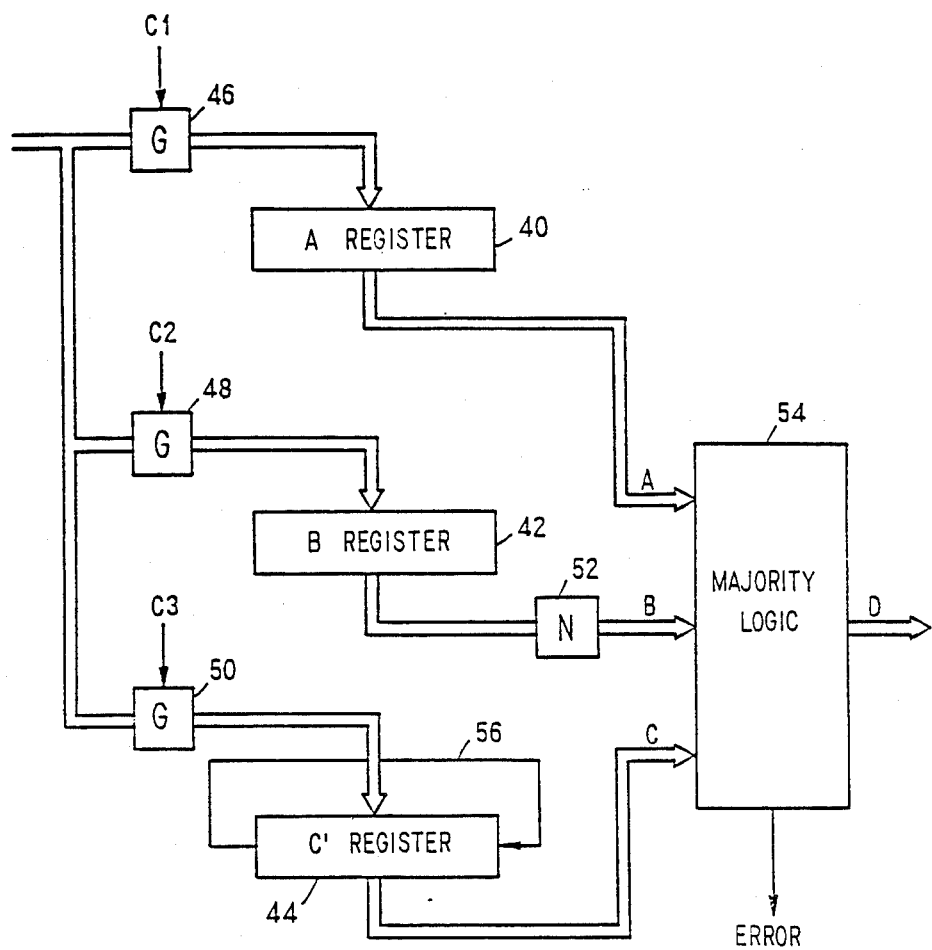
FIG. 3 is a block diagram showing a structural example of a data receiving section in the printer 14.

FIG. 3 shows a structural example of a data receiving section in the printer 14. This comprises three registers 40, 42 and 44 with respective input gates 46, 48 and 50, an inverter 52, and a majority logic 54. The printer 14 loads the A register 40, the $\overline{B}$ register 42 and the C' register 44 with the sequentially received data A, $\overline{B}$ and C' through the respective input gates 46, 48 and 50. The data A loaded in the A register 40 is sent to the majority logic 54 as it is. The data $\overline{B}$ loaded in the $\overline{B}$ register 42 is inverted by the inverter 52 and then sent to the majority logic 54. The data C' loaded in the C' register 44 is sent to the majority logic 54 after a left recirculating shift of one bit (or right recirculating shift of seven bits) through a recirculating path 56. As previously described, the C' register 44 must perform an operation which is reverse to the bit permuting operation performed by the D* register 24 in the controller 12.

The majority logic 54 successively compares the three received data A, B and C, and either outputs the compared data as D if at least one of A=B, B=C and C=A is true, or indicates that an error has occurred if none is true. i.e. all of the data A, and B and C are different. It is apparent that a correct data is obtained by a majority voting when the error has occurred in only one data out of three data A, B and C and, therefore, sole cases are next described in which errors have occurred in two or three data.

The data D, $\overline{D}$ and D* sent out from the controller 12 are assumed to be as follows:
 D = 10010110
 $\overline{D}$ = 01101001
 D* = 01001011

It is also assumed hat respective bit numbers are, from the left, 0, 1, 2, - - - 7. If a stuck at "1" failure has occurred on a line transferring bit 0 in the parallel bus 10, he data received by the printer 14 become as follows:
 A = 10010110
 $\overline{B}$ = 11101001

C' = 11001011

Reconverting $\overline{B}$ and C' to their original forms, the following is obtained,
 B = 00010110
 C = 10010111 in which all of A, B and C are different from each other, and thus the majority logic 54 indicates an error. However, the original data D could be obtained by a majority voting if the stuck at "1" failure has occurred on bit 1, bit 4, bit 6 or bit 7 (each of these bit positions has two "1" bits out of vertically aligned three bits) thus producing an error in only one data.

Next, it is assumed that a certain failure other than the permanent failure has occurred to force bit 2 in the data D and $\overline{D}$ to "1". The data received by the printer 14 are as follows:
 A = 10110110
 $\overline{B}$ = 01101001
 C' = 01001011

Reconverting $\overline{B}$ and C' to their original forms, the following is obtained,
 B = 10010110
 C = 10010110 in which B=C is concluded so that the majority logic 54 outputs the compared data as D.

The same principle is applied when multi bit errors have occurred in two or three data. In that case, however, a possibility of obtaining the correct D becomes small as compared with the case of single bit errors.

Therefore, it is possible to completely correct an error by a majority voting if it has occurred in only one data, and it is also possible for a receiver to correctly detect (and correct as the case may be) errors occurring in two or three data which are sequentially transferred.

Having thus described our invention, what we claim as new, and desire to secure by Letters Patent is:

1. In a system transferring binary data from a first apparatus to a second apparatus through a parallel bus, a method of error detection and correction by a majority comprising steps of converting original binary data to first and second forms by generating in said first apparatus an inverted data form formed by inverting the binary state of said original binary data to be transferred, and generating a bit permuted data form of said original binary data by permuting binary bits in said original binary data, transferring in sequence said original binary data, said inverted data form, and said bit permuted data form to said second apparatus through said parallel bus, reconverting said inverted data form and said bit permuted data form to original forms, respectively, in said second apparatus, and determining a majority among the reconverted inverted data form, permuted data form, and said original binary data.

2. The method of claim 1 wherein said bit permuted data form is generated by rotating said original data in a predetermined direction by a predetermined number of bits, and is reconverted to the original form in said second apparatus by rotating in an opposite direction by said predetermined number of bits.

* * * * *